United States Patent
Belt et al.

(10) Patent No.: US 10,359,570 B1
(45) Date of Patent: Jul. 23, 2019

(54) FREE-SPACE OPTICAL COMMUNICATIONS BEACON SOURCE ARCHITECTURE

(71) Applicant: X Development LLC, Mountain View, CA (US)

(72) Inventors: Robert Todd Belt, Los Altos, CA (US); Nam-hyong Kim, San Jose, CA (US); Baris Erkmen, Mountain View, CA (US); Edward Keyes, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 5 days.

(21) Appl. No.: 15/806,960

(22) Filed: Nov. 8, 2017

Related U.S. Application Data (60) Provisional application No. 62/438,173, filed on Dec. 22, 2016.

(51) Int. Cl.
*H04B 10/00* (2013.01)
*G02B 6/293* (2006.01)
(Continued)

(52) U.S. Cl.
CPC ............ *G02B 6/293* (2013.01); *G02B 6/32* (2013.01); *G02B 6/34* (2013.01); *G02B 17/023* (2013.01); *G02B 26/0816* (2013.01); *G02B 27/0955* (2013.01); *G02B 27/1006* (2013.01); *G02B 27/30* (2013.01); *H04B 10/1129* (2013.01);
(Continued)

(58) Field of Classification Search
CPC ............ H04B 10/112; H04B 10/1123; H04B 10/1125; H04B 10/1127; H04B 10/1129; H04B 10/114; H04B 10/1143; H04B 10/1149; H04B 10/116

USPC ........ 398/118, 119, 120, 121, 122, 124, 125, 398/127, 128, 129, 130, 131, 135, 136, 398/115
See application file for complete search history.

(56) References Cited

U.S. PATENT DOCUMENTS

| 5,777,768 A * | 7/1998 | Korevaar ........... H04B 10/1127 398/129 |
| 6,181,450 B1 | 1/2001 | Dishman et al. |
| 6,498,668 B1 | 12/2002 | Korevaar |
| 6,618,177 B1 | 9/2003 | Kato et al. |
| 6,731,878 B1 | 5/2004 | Britz et al. |
| 7,593,641 B2 | 9/2009 | Tegge, Jr. |

(Continued)

FOREIGN PATENT DOCUMENTS

WO    2006128239 A1    12/2006

OTHER PUBLICATIONS

International Search Report and Written Opinion dated Mar. 15, 2018, for International Application No. PCT/US2017/064190. 13 pages.

*Primary Examiner* — Hanh Phan
(74) *Attorney, Agent, or Firm* — Botos Churchill IP Law LLP (57) ABSTRACT

The technology relates to the design and placement of beacon transmission optics for free space optical communications ("FSOC"). One aspect of the disclosure provides an FSOC device with a beam steering mechanism, a beam column with a beam expander, an optical bus, and beacon transmission optics. The beacon transmission optics includes a prism that directs outgoing beacon beams into the beam column, and toward the beam steering mechanism. In one embodiment, the outgoing beacon beams do not need to travel through the beam expander of the beam column. As a (Continued)

result, backscatter is minimized and incoming or outgoing beams can be controlled with a single beam-steering mechanism.

20 Claims, 9 Drawing Sheets

(51) Int. Cl.
| | |
|---|---|
| *G02B 27/10* | (2006.01) |
| *G02B 26/08* | (2006.01) |
| *G02B 27/09* | (2006.01) |
| *G02B 6/32* | (2006.01) |
| *G02B 17/02* | (2006.01) |
| *G02B 6/34* | (2006.01) |
| *H04B 10/112* | (2013.01) |
| *H04B 10/40* | (2013.01) |
| *H04B 10/25* | (2013.01) |
| *G02B 27/30* | (2006.01) |
| *H04B 7/195* | (2006.01) |

(52) U.S. Cl.
CPC ............. *H04B 10/25* (2013.01); *H04B 10/40* (2013.01); *H04B 7/195* (2013.01)

(56) References Cited

U.S. PATENT DOCUMENTS

| | | | |
|---|---|---|---|
| 2003/0076604 A1 | 4/2003 | Hagood et al. | |
| 2003/0147142 A1 | 8/2003 | Biswas et al. | |
| 2004/0013351 A1 | 1/2004 | Zhao et al. | |
| 2004/0208595 A1* | 10/2004 | Mok | H04B 10/1125 398/128 |
| 2007/0031151 A1* | 2/2007 | Cunningham | H04B 10/1123 398/131 |
| 2010/0074618 A1* | 3/2010 | Togawa | G02B 6/3514 398/45 |
| 2015/0215041 A1 | 7/2015 | Pechner | |
| 2016/0112124 A1* | 4/2016 | Juarez | H04B 10/112 398/118 |

\* cited by examiner

FREE-SPACE OPTICAL COMMUNICATIONS BEACON SOURCE ARCHITECTURE

CROSS-REFERENCE TO RELATED APPLICATIONS

The present application claims the benefit of the filing date of U.S. Provisional Patent Application No. 62/438,173 filed Dec. 22, 2016, the disclosure of which is hereby incorporated herein by reference.

BACKGROUND

Communication terminals may transmit and receive optical signals through free space optical links. In order to accomplish this, such terminals generally use acquisition and tracking systems to establish the optical link by pointing optical beams toward one another. For instance, a transmitting terminal may use a beacon laser to illuminate a receiving terminal, while the receiving terminal may use a position sensor to locate the beacon laser from the transmitting terminal. Steering mechanisms may maneuver the terminals to point toward each other and to track the pointing once acquisition is established. A high degree of pointing accuracy may be required to ensure that the optical signal will be correctly received.

BRIEF SUMMARY

One aspect of the disclosure provides a device including a beam steering mechanism, an optical bus, a beam column, and a prism. The beam column includes a beam expander. The beam column is operatively positioned between the beam steering mechanism and the optical bus. The prism is coupled to the beam column such that one or more outgoing beacon beams travel through the prism, into the beam column, and toward the beam steering mechanism without entering the beam expander.

In one implementation, the prism blocks less than 30% of a main clear aperture of the device, although in other implementations the prism may block less than 10% of the main clear aperture. In another implementation, the prism is a parallelepiped prism. In another implementation, the prism is a trapezoidal prism. In another implementation, the prism is configured so that the one or more outgoing beacon beams reflect off of an even number of surfaces of the prism when traveling through the prism. In another implementation, the prism consists essentially of a single transparent material. In another implementation, the prism includes a transparent material and one or more antireflection or high-reflective coatings on one or more surfaces of the prism. In another implementation, the prism includes a transparent material and one or more other materials, and the one or more other materials are glued to one or more surfaces of the prism by adhesive. In another implementation, the prism includes a support structure and one or more mirrors.

Yet another aspect of the disclosure provides a system including a beam steering mechanism, a beam column, an optical bus, a beacon transmitter, and a prism. The beam column includes a beam expander. The beacon transmitter is configured to generate beacon beams. The prism is configured to direct beacon beams generated by the beacon transmitter into the beam column and toward the beam steering mechanism without causing the beacon beams to enter the beam expander.

In one implementation, the prism blocks less than 10% of a main clear aperture of the system. In another implementation, the prism is a parallelepiped prism. In another implementation, the system also includes one or more transceivers configured to send and receive data beams that travel through the optical bus and the beam expander. In another implementation, both the beacon transmitter and the one or more transceivers utilize laser diodes to generate the beacon beams and the data beams, respectively. In another implementation, the beam steering mechanism includes a mirror. In this implementation, a portion of the mirror is configured to reflect both the beacon beams and the data beams generated by the beacon transmitter and the one or more transceivers, respectively. In another implementation, the system includes an image sensor; and a beam splitter configured to (1) separate one or more received beacon beams from a plurality of received optical beams based on a wavelength of the one or more received beacon beams and (2) direct the one or more received beacon beams towards the image sensor. In another implementation, the system includes one or more computing devices configured to determine a position of a device transmitting the one or more received beacon beams based on one or more of a shape, size, or location of an image of the one or more received beacon beams on a focal plane of the image sensor. In another implementation, the one or more computing devices are configured to determine the position of the device transmitting the one or more received beacon beams, in part, by estimating a centroid of a spot created by the one or more received beacon beams on the focal plane of the image sensor. In another implementation, the system is disposed on a mobile platform. In this implementation, the mobile platform includes an unmanned aerial vehicle or a balloon.

BRIEF DESCRIPTION OF THE DRAWINGS

FIGS. 5(*a*)-(*d*) depict prism arrangements in accordance with aspects of the disclosure.

DETAILED DESCRIPTION

The technology described herein relates to the design and placement of beacon transmission optics for free-space optical communications ("FSOC"). One aspect of the disclosure provides an FSOC device with a beam steering mechanism, a beam column with a beam expander, an optical bus, and beacon transmission optics. The beacon transmission optics include a prism that directs outgoing beacon beams into the beam column, and toward the beam steering mechanism. In one embodiment, the outgoing beacon beams do not need to travel through the beam expander of the beam column. As a result, backscatter is minimized and incoming or outgoing beams can be controlled with a single beam-steering mechanism.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents.

Figure 1:
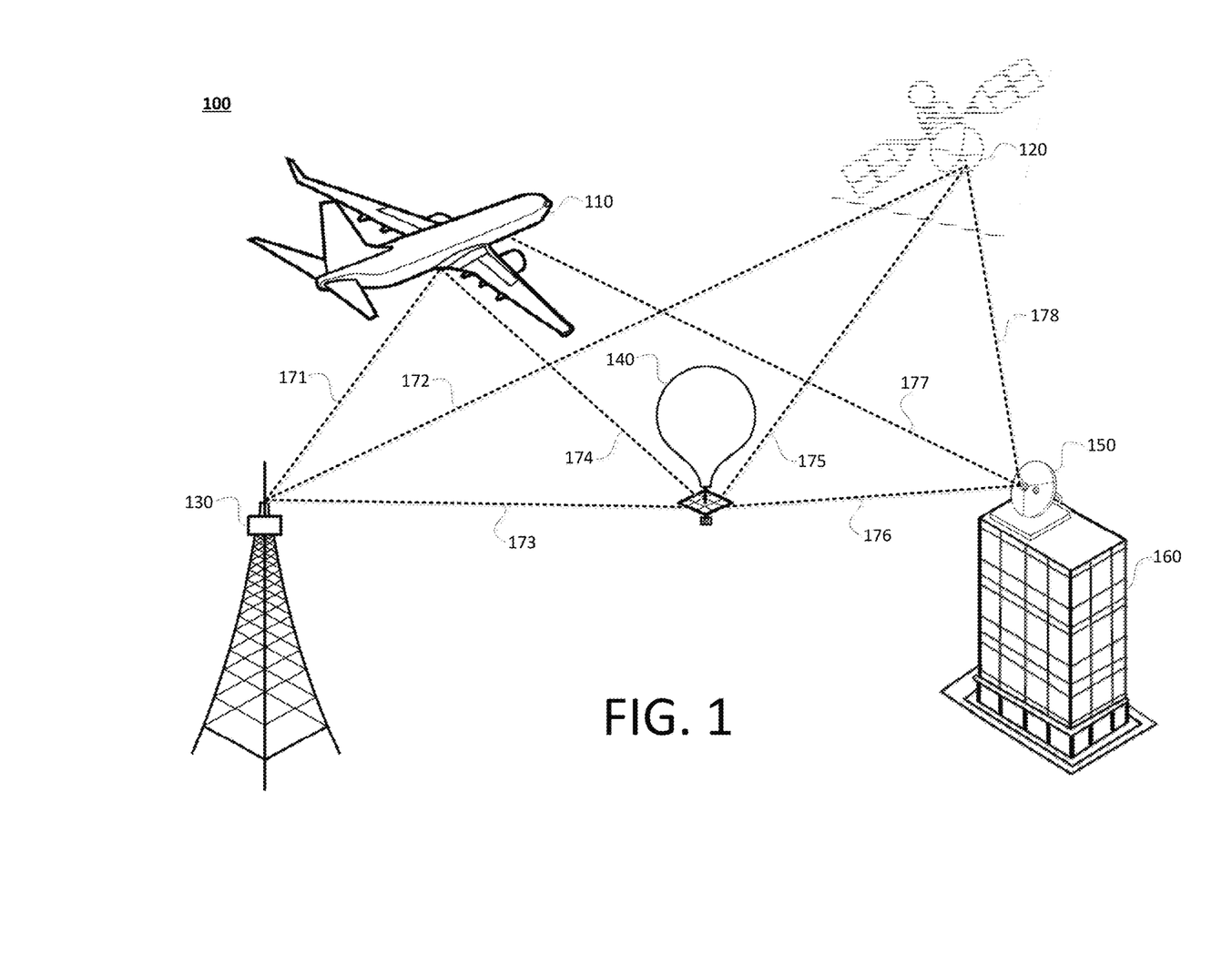
FIG. 1 illustrates a wireless communications network with multiple FSOC devices in accordance with aspects of the disclosure.

FIG. 1 illustrates a global-scale communications network 100 including various communication devices, such as airplane 110, satellite 120, base station 130, balloon 140, and terminal 150, which is located on top of building 160. All of these communications devices, both mobile platforms and fixed platforms, may wirelessly transmit and receive optical signals amongst one another through FSOC links (e.g., FSOC links 171-178). The communications devices illustrated in FIG. 1 may also reroute communications signals, e.g. to end users or other networks. For example, base station 130 may reroute a communications signal received from airplane 110 through FSOC link 171 to balloon 140 through FSOC link 173.

Airplane 110 may be an unmanned aerial vehicle ("UAV"), such as, for example, an autonomous aircraft or a remotely piloted aircraft. In some examples, airplane 110 is remotely piloted and autonomous at the same time. A UAV usually includes wings to maintain stability, a GPS system to guide it through its autonomous piloting, and a power source (e.g., internal combustion engine or electric battery) to maintain long hours of flight. In some examples, airplane 110 may be designed to maximize efficiency and reduce drag during flight.

Satellite 120 may be an object placed into orbit around the Earth, and may serve different purposes, such as, for example, military or civilian observation satellites, communication satellites, navigations satellites, weather satellites, and research satellites. Satellite 120 may be in Low Earth Orbit ("LEO"), Medium Earth Orbit ("MEO"), or High Earth Orbit ("HEO"). In some implementations, satellite 120 may include solar panels or rechargeable batteries. Satellite 120 may also include a reaction control system ("RCS") that uses thrusters to adjust the altitude and translation of satellite 120. The RCS may also provide small amounts of thrusts in one or more directions and torque to allow control of the rotation of satellite 120 (e.g., roll, pitch, and yaw).

Balloon 140 may include a balloon filled with helium, hydrogen or other gasses, solar panels, batteries, and an equipment box. Balloon 140 may be released into the Earth's stratosphere to attain a desired altitude or range of altitude and provide connectivity to a ground area at speeds comparable to terrestrial wireless data services (e.g., 3G or 4G). Balloon 140 may float in the stratosphere, at an altitude higher than typical flight paths of airplanes and the weather. In one particular example, balloon 140 can be steered by rising or descending to an altitude with winds moving in a desired direction. Winds in the stratosphere are usually steady and move slowly at about 5 and 20 mph, and each layer of wind varies in direction and magnitude. In some examples, balloon 140 may include one or more computing devices configured to execute algorithms to determine where balloon 140 needs to go. The one or more computing devices may further be configured to move balloon 140 into a layer of wind blowing in a direction that may take the balloon where it should be going.

Base station 130 and terminal 150 are stationary ground-based communications devices. Base station 130 includes a tall support structure, whereas terminal 150 is a much smaller device located on the roof of building 160. However, both devices may be configured as gateways between the global-scale communications network of FIG. 1 and one or more other networks. For example, base station 130 and terminal 150 may serve as interfaces between the communications devices of FIG. 1 and the Internet, a cellular service provider's network, and/or other types of networks.

In order to accurately establish an FSOC link, any one of airplane 110, satellite 120, base station 130, balloon 140, or terminal 150 may transmit a beacon beam. A beacon beam may have a larger beam divergence than that of the one or more data beams used in an FSOC link. In some implementations, about a 0.001-degree accuracy may be needed to properly establish an FSOC link. In one example, satellite 120 may transmit a beacon beam in the general direction of terminal 150. In response, terminal 150 can estimate the location of satellite 120 based on the direction from which it received the beacon beam, and orient itself to establish FSOC link 178. Terminal 150 can then transmit one or more data beams toward satellite 120 through FSOC link 178. Terminal 150 may also transmit a beacon beam toward satellite 120. In response, satellite 120 can estimate the location of satellite 120 based on the direction from which it received the beacon beam, and orient itself to improve the reliability of FSOC link 178. The data beams transmitted by satellite 120 may also contain feedback information that can be used by terminal 150 to further improve the reliability of FSOC link 178. In another example, the roles of satellite 120 and terminal 150 may be reversed. Furthermore, any one of airplane 110, base station 130, or balloon 140 may replace satellite 120 or terminal 150 in the above examples.

Figure 2:
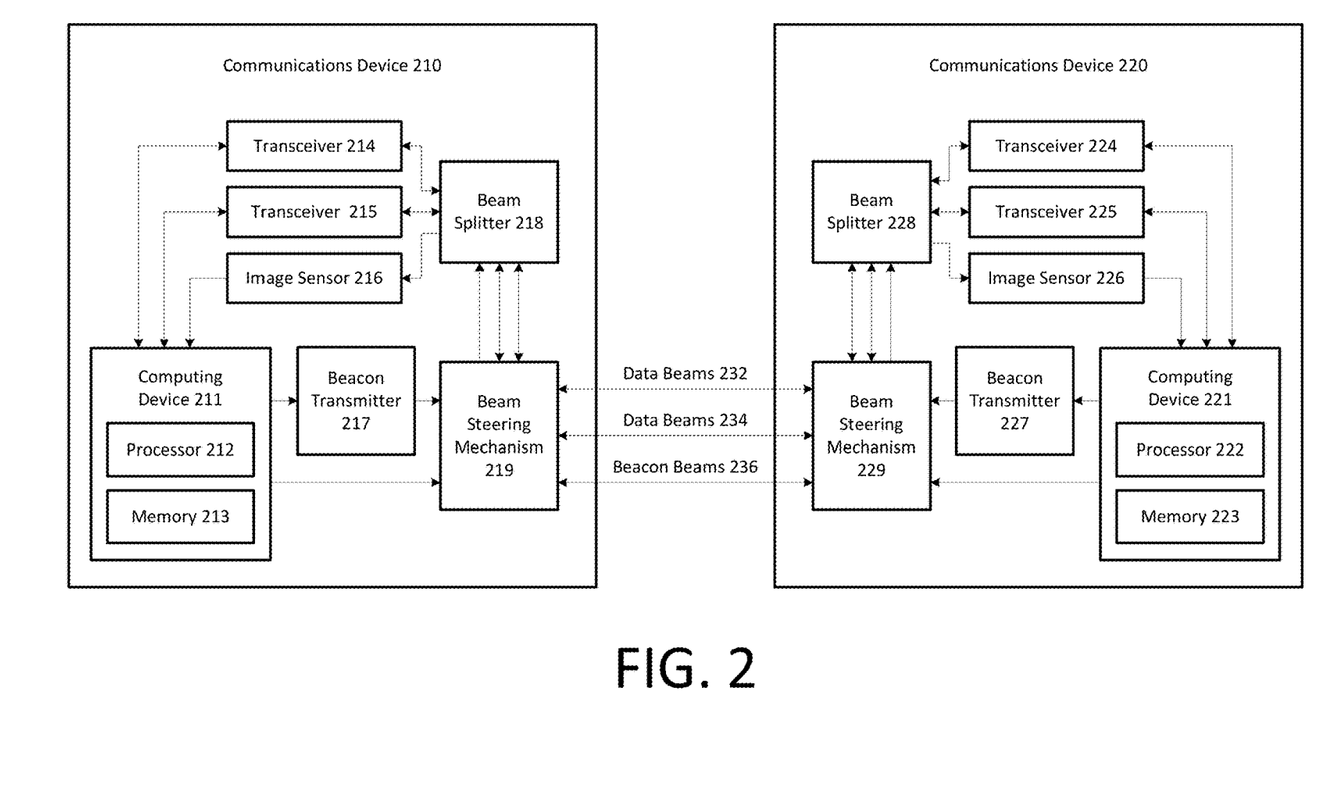
FIG. 2 is a functional block diagram of two devices utilizing an FSOC link to communicate in accordance with aspects of the disclosure.

FIG. 2 is a functional block diagram 200 of two communications devices utilizing an FSOC link. Any of the communications devices illustrated in the global-scale communications network of FIG. 1 may operate in a manner similar to communications devices 210 and 220. Communications device 210 may have one or more computing devices, such as, for example, computing device 211, which contains processor 212, memory 213, and other components typically present in general purpose computing devices. Communications device 210 also includes transceivers 214 and 215, image sensor 216, beacon transmitter 217, beam splitter 218, and beam steering mechanism 219. Similarly, communications device 220 may have one or more computing devices, such as, for example, computing device 221, which contains processor 222, memory 223, and other components typically present in general purpose computing devices. Communications device 220 also includes transceivers 224 and 225, image sensor 226, beacon transmitter 227, beam splitter 228, and beam steering mechanism 229. As discussed below, each transceiver for a particular communication device may operate on a particular frequency or frequency band. And as shown in FIG. 2, data beams 232 and 234 and beacon beams 236 are transmitted and received through an FSOC link between communications devices 210 and 220.

As shown in FIG. 2, processors 212 and 222 may be any conventional processors, such as, for example, commercially available CPUs. Alternatively, processors 212 and 222 may be dedicated devices such as, for example, ASICs or other hardware-based processors. Although FIG. 2 functionally illustrates the processor, memory, and other elements of computing devices 211 and 221 as being within the same block, it will be understood by those of ordinary skill in the art that the processor, computing device, or memory may actually include multiple processors, computing devices, or memories that may or may not be stored within the same physical housing. For instance, memories 213 and 223 may be hard drives or other storage mediums located in different housings from that of computing devices 211 and 221 respectively. Accordingly, references to a processor or computing device will be understood to include references to a collection of processors or computing devices or memories that may or may not operate in parallel.

Memories 213 and 223 are configured to store information accessible by processors 211 and 221 respectively, including instructions and data that may be executed or otherwise used by processors 211 and 221. Memories 213 and 223 may be of any type capable of storing information accessible by the processor, including a computing device-readable medium, or other medium that stores data that may be read with the aid of an electronic device, such as, for example, a hard-drive, memory card, ROM, RAM, DVD or other optical disks, as well as other write-capable and read-only memories. Systems and methods may include different combinations of the foregoing, whereby different portions of the instructions and data are stored on different types of media.

When functioning as transmitters, transceivers 214, 215, 224, and 225 may receive modulated electrical signals from computing devices 211 and 221, convert those electrical signals into optical beams, and output data beams 232 and 234 into an optical bus through one or more optical fibers. To accomplish this, transceivers 214, 215, 224, and 225 may include light-emitting diodes ("LEDs") or laser diodes (e.g., fiber lasers and solid state lasers). Transceivers 214, 215, 224, and 225 may also include single-mode laser diodes that support one optical mode, or multimode laser diodes that support multiple-transverse optical modes. An optical mode is a particular electromagnetic field pattern of radiation measured in a plane perpendicular (i.e., transverse) to the propagation direction of the beam. In some implementations, transceivers 214 and 224 may generate data beams 232 with a wavelength of approximately 1550 nm (e.g., within a tolerance of +/−0.3 percent), and transceivers 215 and 225 may generate data beams 234 with a wavelength of approximately 1565 nm (e.g., within a tolerance of +/−0.3 percent). It should be understood that such wavelengths are merely examples, and that other wavelengths of data beams may be generated.

When functioning as receivers, transceivers 214, 215, 224, and 225 may receive data beams 232 and 234, convert data beams 232 and 234 into electrical signals, and provide those electrical signals to computing devices 211 and 221. To accomplish this, transceivers 214, 215, 224, and 225 may include de-multiplexers, optical pre-amplifiers, photodiodes, photo receivers, transimpedance amplifiers, clock/phase recovery circuits, decision circuits, and/or forward error correction circuits. Transceivers 214, 215, 224, and 225 may be replaced with separate receiving and transmitting circuits that operate in much the same way. By using one transceiver (e.g., transceivers 214 and 224) to send and receive data beams with a particular wavelength (e.g., data beams 232) and using another transceiver (e.g., transceivers 215 and 225) to send and receive data beams with a different wavelength (e.g., data beams 234), communications devices 210 and 220 can form two data channels through which they can simultaneously send and receive data.

Beacon transmitters 217 and 227 may be configured by computing devices 211 and 221 to output optical beams (e.g., beacon beams 236) into a system of beacon transmission optics. To accomplish this, beacon transmitters 217 and 227 may include LEDs or laser diodes (e.g., fiber lasers and solid state lasers). Much like the transceivers discussed above, beacon transmitters 217 and 227 may also include single-mode laser diodes that support one optical mode, or multimode laser diodes that support multiple-transverse optical modes. In some implementations, beacon transmitters 217 and 227 may generate beacon beams 232 with a wavelength of approximately 850 nm (e.g., within a tolerance of +/−0.5 percent). In other implementations, the beacon beam wavelength may be greater or smaller than 850 nm.

Image sensors 216 and 226 may be light position sensing devices configured to detect optical beams (e.g., beacon beams 236). Image sensors 216 and 226 may include lateral position devices, charge-coupled device ("CCD") cameras, photodetectors, or quad-cells, to detect optical beams. Image sensor 216 may also convert the received optical beams into electric signals using the photoelectric effect.

Beam splitters 218 and 228 can separate incoming optical beams based on the wavelengths of those optical beams. For example, as mentioned above, communications devices 210 and 220 may transmit and receive data beams 232 at a wavelength on the order of 1550 nm, data beams 234 at a wavelength of 1565 nm, and beacon beams at a wavelength on the order of 850 nm. Beam splitters 218 and 228 can separate data beams 232 and 234 and beacon beams 236 based on their wavelengths, so that, for example, data beams 232 are received by transceiver 215, data beams 234 are received by transceiver 215, and beacon beams 236 are received by image sensor 216. In order to accomplish this, beam splitters 218 and 228 may include one or more prisms and/or mirrors. Multiple prisms may be glued together with an adhesive. Furthermore, each prism may be configured to allow optical beams with wavelengths within a predetermined range to pass through unimpeded, and reflect optical beams with wavelengths outside that range.

Computing devices 210 and 220 can adjust the direction in which optical beams (e.g., data beams 232 and 234 and beacon beams 236) are transmitted or received by controlling beam steering mechanisms 219 and 229. Beam steering mechanisms 219 and 229 may each include a mirror and a motorized gimbal that can adjust, for example, the roll, pitch, and/or yaw of the mirror. Adjusting the direction in which the optical beams are transmitted or received can improve the reliability of the FSOC link between communications devices 210 and 220. In some implementations, computing devices 211 and 221 may control beam steering mechanisms 219 and 229 respectively through the use of a negative feedback algorithm. For example, computing devices 211 and 221 may adjust the roll, pitch, and/or yaw of the mirrors of beam steering mechanisms 219 and 229 to maximize the signal strength of one or more optical beams received over the FSOC link.

Beacon beams 236 may be used by computing devices 211 and 221 to establish the FSOC link between communications devices 210 and 220. For example, communications device 210 can generate beacon beams 236 using beacon transmitter 217, and direct them in the general direction of communications device 220 using beam steering mechanism 219. In some implementations, it may be advantageous to transmit beacon beams 236 having a larger beam divergence than that of data beams 232 and 234. A larger beam divergence disperses the strength of beacon beams 236 across a larger area, and may allow communications device 210 to more easily locate communications device 220.

Once a beacon beam 236 reaches communications device 220, it is directed toward image sensor 226 by beam steering mechanism 229 and beam splitter 228. Based on the shape, size, and/or location of an image of a beacon beam 236 on a focal plane of image sensor 226, computing device 221 can determine the direction from which beacon beam 236 was transmitted. This process may, for example, involve estimating the centroid of a spot created on the focal plane of image sensor 226 by the beacon beam 236. After determining the direction from which the beacon beam 236 was transmitted, computing device 221 can establish an FSOC link between communications devices 210 and 220 by configuring beam steering mechanism 229 such that any data beams 232 and 234 generated by transceivers 224 and 225 and any beacon beams generated by beacon transmitter 227 are directed at communications device 210.

After receiving beacon beam 236 from communications device 220, communications device 210 can perform a similar process to enhance the reliability of the FSOC link. Communications device 210 may also receive feedback information through data beams 232 and 234 transmitted by communications device 220 to further enhance the reliability of the FSOC link. Any of these processes may be repeated over time by communications devices 210 and 220 in order to maintain the FSOC link between them. Furthermore, the roles of communications devices 210 and 220 in the scenario described above may be reversed. Once an FSOC link is established, communications devices 210 and 220 can send and receive a wide variety of data through data beams 232 and 234. For example, communications devices 210 and 220 can send or receive internet protocol ("IP") packets, consultative committee for space data systems ("CCSDS") packets, packetized elementary stream ("PES") packets, near instantaneous companded audio multiplex ("NICAM") packets, etc.

FIG. 2 incorporates several connectors with arrows in order to illustrate examples of the processes described above. These arrows do not limit the directions in which data can flow between the various components depicted in FIG. 2. For instance, before any of the processes described above can occur, computing devices 211 and 221 may need to initialize and configure image sensors 216 and 226. An initialization or configuration process may require computing devices 211 and 221 to send packets of information to image sensors 216 and 226.

Figure 3:
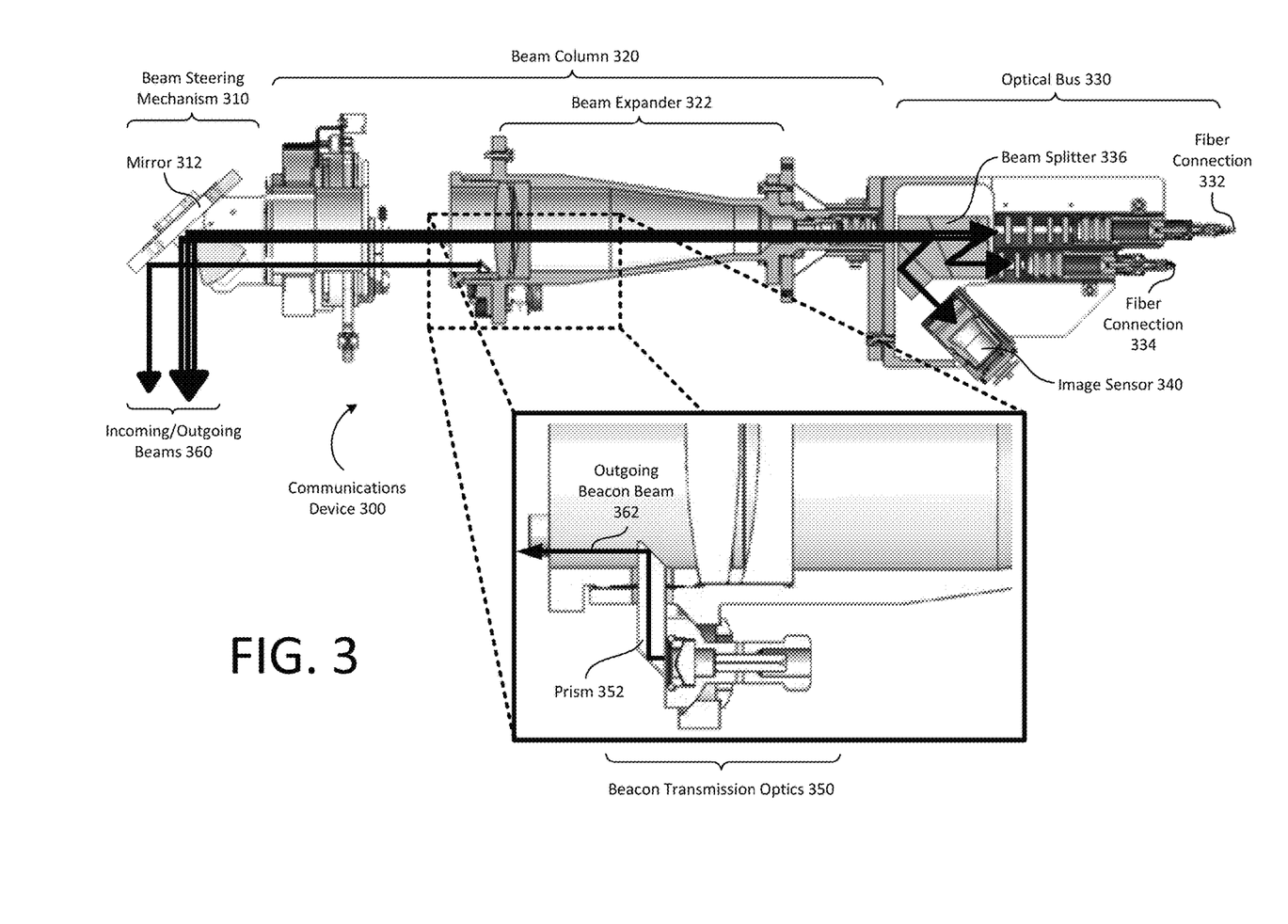
FIG. 3 illustrates structural components of an FSOC device in accordance with aspects of the disclosure.

FIG. 3 illustrates structural components of a communications device in accordance with an embodiment. Communications device 300 may operate in an equivalent manner as communications devices 210 and 220 of FIG. 2. As shown in FIG. 3, communications device 300 includes beam-steering mechanism 310, beam column 320, optical bus 330, and image sensor 340. Incoming beams 360 (e.g., data and beacon beams) reflect off of mirror 312 of beam steering mechanism 310, and are directed into beam column 320. While traversing through beam column 320, incoming beams 360 pass through beam expander 322, which reduces the beam divergence of incoming beams 360. After traversing the length of beam column 320, incoming beams 360 enter optical bus 330. Once in optical bus 330, incoming beams 360 may be separated based on their wavelengths by beam splitter 336. As shown in FIG. 3, beam splitter 336 can separate incoming beams 360 into three types of optical beams—two types of data beams and beacon beams—based on their wavelength. The two types of data beams can be communicated to one or more transceivers (not shown) through fiber connections 332 and 334. The beacon beams may be received by image sensor 340. Outgoing beams 360 that are data beams would traverse the same path described above in reverse. However, instead of reducing the beam divergence of outgoing data beams, beam expander 322 would increase their beam divergence.

Communications device 300 also includes beacon transmission optics 350 for transmitting outgoing beams 360 that are beacon beams (e.g., outgoing beacon beam 362). Beacon transmission optics 350 includes a prism 352, which directs beacon beams into beam column 320, and towards mirror 312. By placing the prism 352 between beam steering mechanism 310 and beam expander 322, backscatter is minimized and incoming/outgoing beams 360 can be controlled with a single beam-steering mechanism. If, for example, beacon transmission optics 350 were coupled to mirror 312, the reflection angles would be twice the angular position of mirror 312. Furthermore, if the prism 352 were embedded inside beam expander 322 or optical bus 330, there could be a significant amount of backscatter created by the various surfaces (e.g., lenses) within those components.

Figure 4:
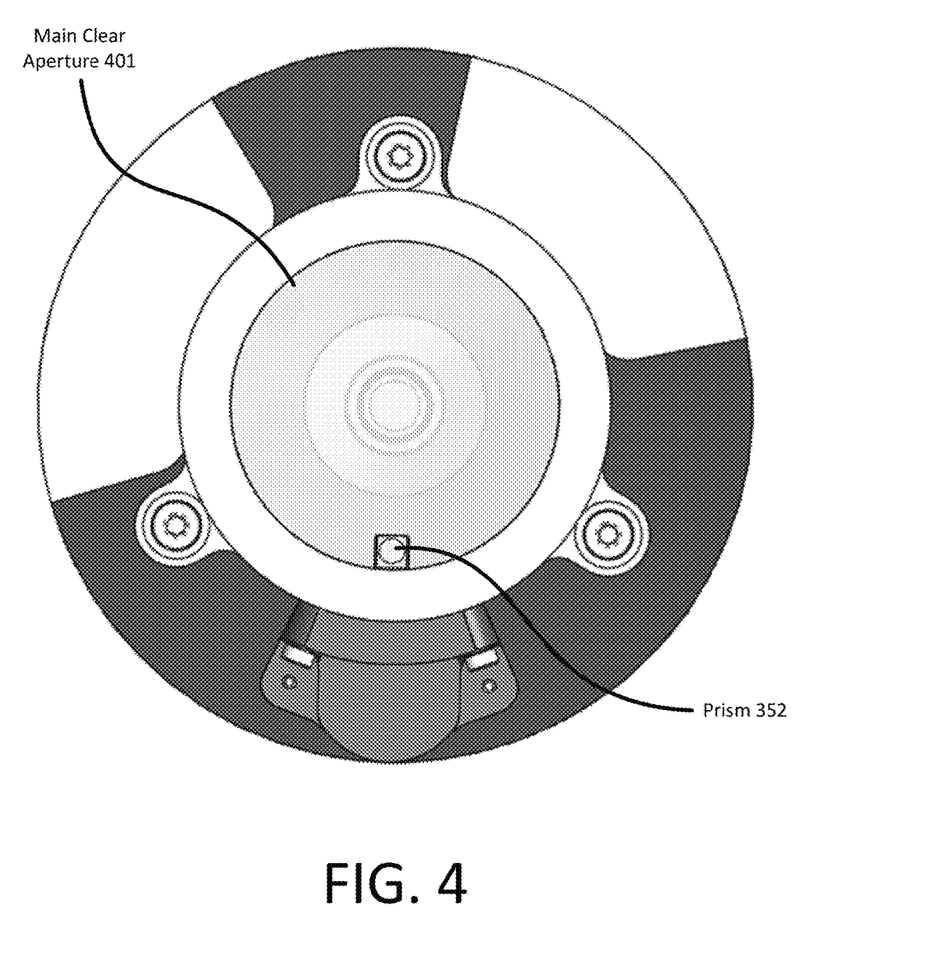
FIG. 4 provides an example view of a communications device of FIG. 3 in accordance with aspects of the disclosure.

FIG. 4 provides a view of communications device 300 from the perspective of one looking into beam column 320 from the side near beam steering mechanism 310. Main clear aperture 401 is the main hole or opening through which incoming/outgoing beams 360 can travel. As shown in FIG. 4, prism 352 blocks a small portion of the main clear aperture 401. For example, the prism 352 may block less than 30%, or even less than 10%, of the main clear aperture 401.

Figure 5:
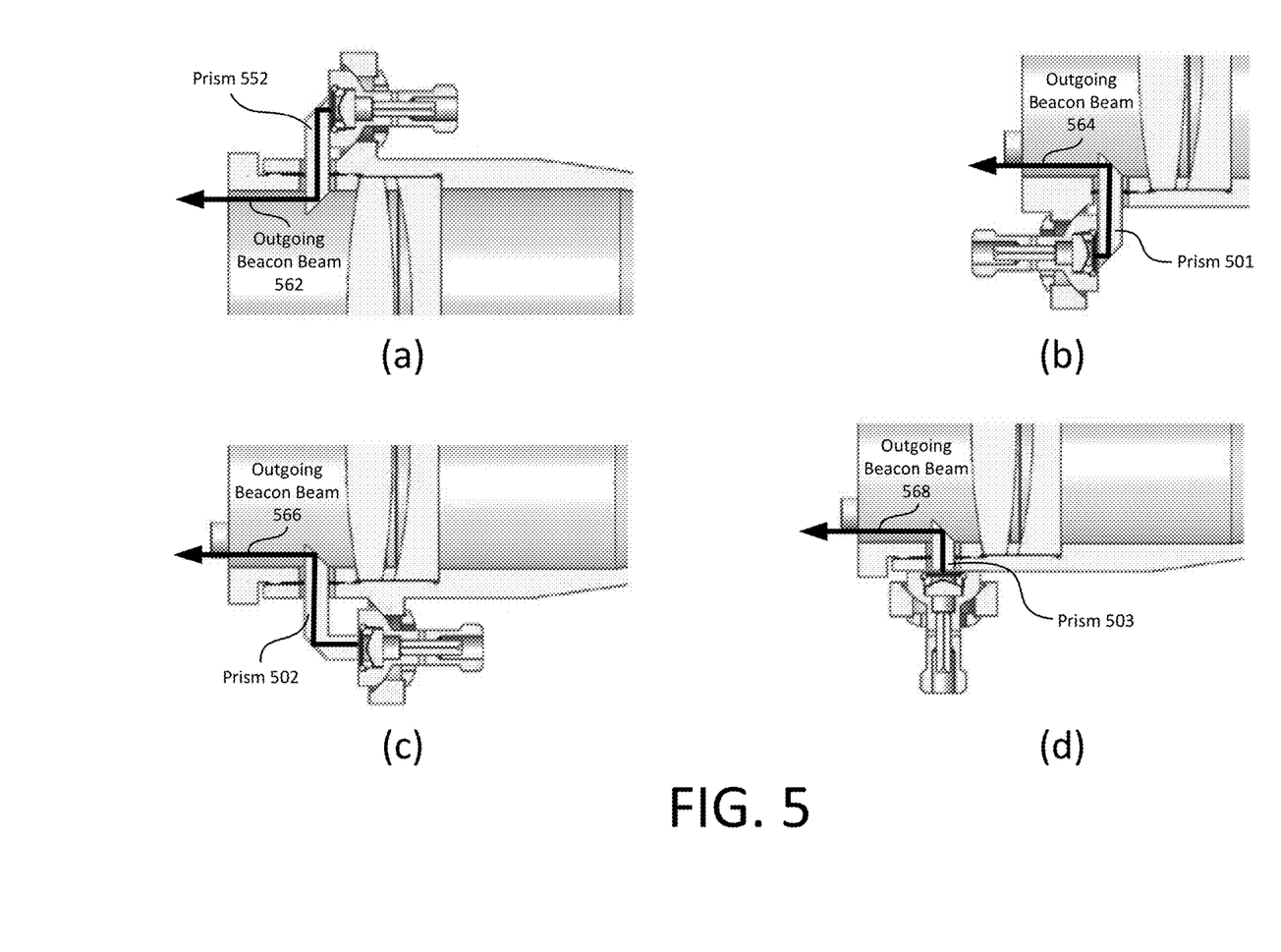

The prism 352 repositions beams of light as they reflect off faces of the prism. FIGS. 5(a)-(d) illustrate that the size, shape, and/or location of prism 352 of FIG. 3 can be changed. Outgoing beacon beams 562, 564, 566, and 568 illustrate the path a beacon beam might traverse in these configurations. As shown in FIG. 5(a), the prism can be located at different points along beam column 320 (e.g., any "clocking" position). For instance, prism 352 can be replaced by prism 552, which has the same size and shape, but is located at the top of beam column 320, as opposed to the bottom.

FIGS. 5(b)-(d) illustrate some of the differently shaped prisms that can replace prism 352. As shown in FIG. 5(b), prism 501, which is a trapezoidal prism, can be used. As shown in FIG. 5(c), the basic shape of prism 352 can be extended in a particular direction to form prism 502. Lastly, as shown in FIG. 5(d), prism 352 can be replaced by prism 503, which only causes beacon beams to reflect off of one of its surfaces. Similarly, prism 352 could also be replaced by a prism, which causes beacon beams to reflect off of more than two of its surfaces. In some implementations, it may be advantageous for the outgoing beacon beams to reflect off of an even number of surfaces of a prism. For instance, a single pair of parallel reflective surfaces can redirect a beam without changing its orientation. Furthermore, a single pair of perpendicular reflective surfaces can redirect a beam and reverse its orientation. Thus, a prism incorporating pairs of parallel and/or perpendicular reflective surfaces can be rotated to a variety of positions without affecting the way it redirects beams.

Figure 6:
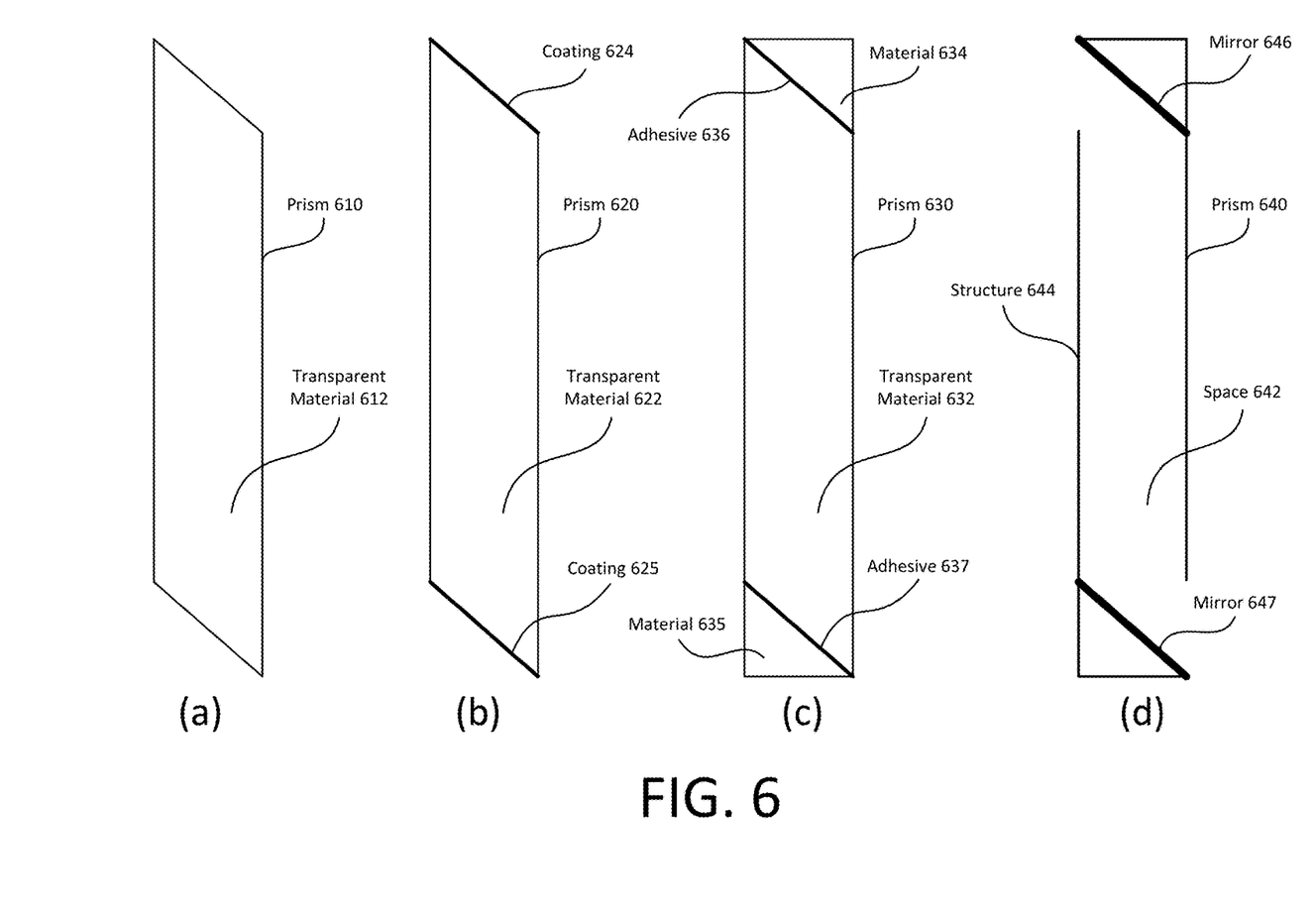
FIG. 6 illustrates different prism structures in accordance with aspects of the disclosure.

FIG. 6 illustrates several different ways in which prism 352 of FIG. 3 can be constructed. For example, as shown in FIG. 6(a), prism 610 is constructed with a single solid transparent material 612. Transparent material 612 can, for example, be a glass or plastic material. A transparent material may provide the advantage of keeping particles, such as, for example, dust, from affecting the optical path traveled by beacon beams. As shown in FIG. 6(b), prism 620 is also constructed with a single solid transparent material 622. However, prism 620 also includes coatings 624 and 625 on two of its faces. Coatings 624 and 625 may, for example, be antireflection coatings or high-reflective coatings. As shown in FIG. 6(c), prism 630 is also constructed with a single solid transparent material 632. However, prism 630 also includes materials 634 and 635, which are glued to two of its faces with adhesives 636 and 637. Materials 634 and 635 may be opaque, translucent, or transparent. Furthermore, adhesives 636 and 637 may, for example, be clear, colorless, liquid photopolymers that will cure when exposed to ultraviolet light. Lastly, as shown in FIG. 6(d), prism 640 may include structure 644 and mirrors 646 and 647. In contrast to the previous configurations, prism 640 has a hollow space 642 where a transparent material would otherwise be.

Figure 7:
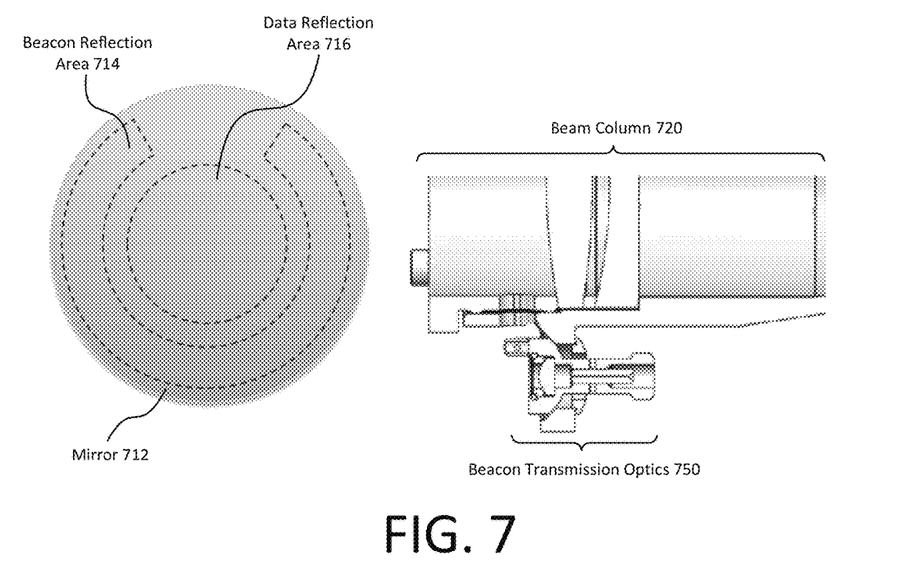
FIG. 7 illustrates an example FSOC device without a prism.

FIG. 7 illustrates a system without a prism. In FIG. 7, beacon transmission optics section 750 is coupled to beam column 720, but there is no prism redirecting the beacon beams into beam column 720. As a result, in order to have a shared optical path, a large mirror 712 must be utilized. In FIG. 7, the small dashed circle drawn on mirror 712 represents the area of mirror 712 that can be used for incoming optical beams and outgoing data beams (e.g., data reflection area 716). The other dashed shape surrounding the small dashed circle represents the area of mirror 712 that can be used for outgoing beacon beams (e.g., beacon reflection area 714).

Figure 8:
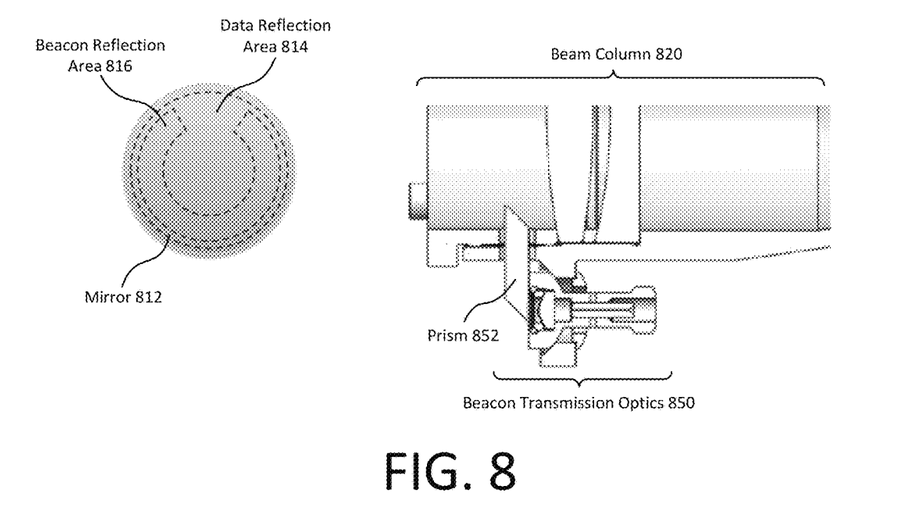
FIG. 8 illustrates an example of an FSOC device with a prism in accordance with aspects of the disclosure.

FIG. 8 illustrates a system with a prism. In FIG. 8, beacon transmission optics section 850 is coupled to beam column 820. Furthermore, prism 852 directs beacon beams into beam column 820, and toward mirror 812. The system of FIG. 8 may also include other components similar to those illustrated in the communications device 300 of FIG. 3. A comparison of the systems illustrated in FIGS. 7 and 8 demonstrates some of the advantages of using a prism to direct beacon beams into a beam column. By using prism 852, mirror 812 can be much smaller than mirror 712 of FIG. 7. This is because the area of mirror 812 used for incoming optical beams and outgoing data beams (e.g., data reflection area 816) and the area of mirror 812 used for outgoing beacon beams (e.g., beacon reflection area 814) overlap. The reduction in size of these components, as compared to the ones shown in FIG. 7, can lead to cost and weight savings, further benefiting the overall system.

FIGS. 9A-9D illustrate another example system 900, where an optical bus and beam column are formed as a single unit. Optically, the system 900 performs the same as the other systems described above, such as with respect to FIG. 3. However, the single unit system 900 may be easily shelved and assembled onto a main telescope when needed with minimal risk to the components thereof.

Figure 9A:
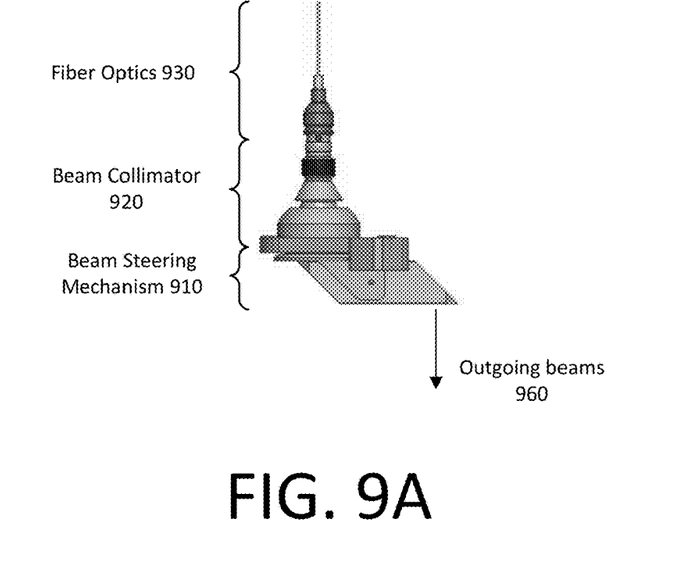
FIGS. 9A-D illustrate another example FSOC device in accordance with aspects of the disclosure.
Figure 9B:
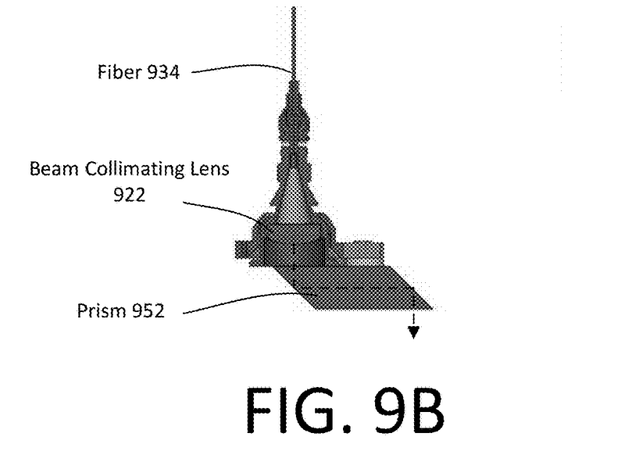

FIG. 9A provides a side view illustration of the system 900, while FIG. 9B provides a side view of internal components. The system 900 includes optical bus 930, beam column 920, and beam steering portion 910. The beam column 920 includes beam collimating lens 922, which collimates light received from one or more fibers 934 and transmits it to a periscope prism 952 from which the light exits. For example, beams from the collimating lens 922 may follow a path 961, reflecting from a second face of the prism 952, a third face of the prism 952, and then exiting.

One advantage of the prism 952 is that it is insensitive to operative misalignment. Optical systems are most sensitive to angular misalignment. As one example, in the case of prism 952, since it is a solid rigid body, the angular movement of one face is equally applied to all faces. Thus if the second face experiences angular movement over time relative to lens 922, then the third face experiences the exact same movement; which optically cancels the effect from second face.

Figure 9C:
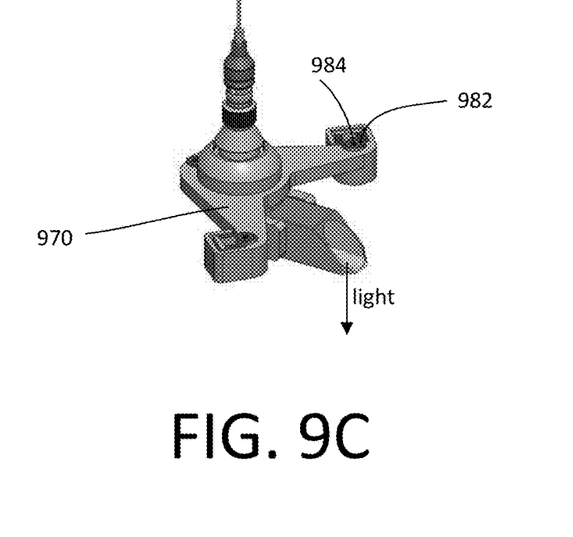
Figure 9D:
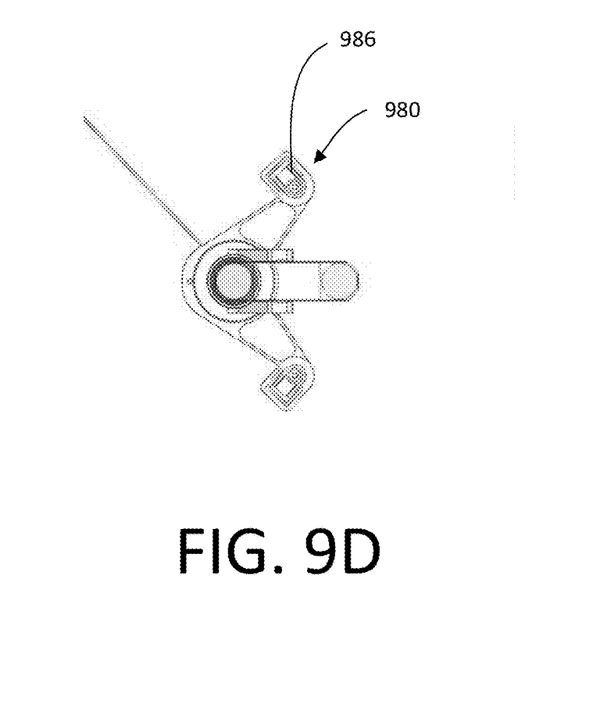

FIG. 9C provides a perspective view of the system 900, and FIG. 9D provides a top view. Each of these illustrations shows further detail regarding an attachment mechanism for mounting the system 900 to a telescope (not shown). The attachment mechanism includes flanges 970 terminating in a parallel flexure system 980. The flanges 970 may be made of any type of material, such as metal, plastic, etc.

The attachment mechanism 980 includes datum pads 982 having a through hole 984 for securing the flanges 970 to the telescope. For example, a screw, pin, or other device may be inserted through the through hole 984 to secure the datum pads 982 to the telescope. In some examples the through holes 984 may be threaded. While three datum pads 982 are shown, it should be understood that more or fewer may be used.

The attachment mechanism may also include flexures 986 coupled to one or more of the the datum pads 982, the flexures 986 enabling lateral movement of the system 900. For example, the flexures 986 may provide for movement of the system 900 on a plane that is substantially orthogonal to pins in through holes 984. In this regard, if stresses are introduced, such as by temperature changes, the flexures 986 relieve such stresses by providing flexibility. The flexures 986 may be any of a variety of types of flexure mechanisms, such as parallel flexures, four bar flexures, etc.

Also shown in FIGS. 9C and 9D, a size of exit 912 for outgoing beams 960 may be increased relative to other examples. In this regard, angles of light traveling along incoming and outgoing paths may be smaller and the light may be better collimated.

The foregoing systems are advantageous in that they enable multiple datacom wavelengths and a beacon camera wavelength to share the same optical axis through a beam expander. Moreover, such designs provide for stability through temperature changes and through shipping shock and vibe, with non-detectable stray light on beacon receive sensor.

As these and other variations and combinations of the features discussed above can be utilized without departing from the disclosure as defined by the claims, the foregoing description of the embodiments should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible embodiments.

The invention claimed is:

1. A device comprising:
   a beam collimator structure having a first end and a second end opposite the first end, the first end of the beam collimator structure being adapted to receive light from one or more optical fibers, the beam collimator structure including a lens positioned to focus the received light, the lens being positioned adjacent the second end of the beam collimator structure;
   a repositioning prism having a first end and a second end opposite the first end, the first end of the repositioning prism being coupled to the second end of the beam collimator structure, and the second end of the repositioning prism being remote from the beam collimator structure; and
   wherein the repositioning prism is configured to reposition the received light that exits the lens by reflecting the light off at least two faces of the repositioning prism.

2. The device of claim 1, wherein the prism is a parallelepiped prism.

3. The device of claim 1, wherein the prism is a trapezoidal prism.

4. The device of claim 1, wherein the prism is configured so that the light reflects off of an even number of surfaces of the prism when traveling through the prism.

5. The device of claim 1, wherein the prism consists essentially of a single transparent material.

6. The device of claim 1, wherein the prism comprises a transparent material and one or more antireflection or high-reflective coatings on one or more surfaces of the prism.

7. The device of claim 1, wherein the prism comprises a transparent material and one or more other materials, and wherein the one or more other materials are glued to one or more surfaces of the prism by adhesive.

8. The device of claim 1, wherein the prism comprises a support structure and one or more mirrors.

9. A free space optical communication (FSOC) terminal comprising:
- a beam steering mechanism;
- a beam column comprising a beam expander;
- an optical bus;
- a beacon transmitter configured to generate beacon beams; and
- a prism configured to direct beacon beams generated by the beacon transmitter into the beam column and toward the beam steering mechanism without causing the beacon beams to enter the beam expander.

10. The FSOC terminal of claim 9, wherein the prism blocks less than 30% of a main clear aperture of the beam column.

11. The FSOC terminal of claim 10, wherein the prism blocks less than 10% of a main clear aperture of the beam column.

12. The FSOC terminal of claim 9, wherein the prism is a parallelepiped prism.

13. The FSOC terminal of claim 9, further comprising:
one or more transceivers configured to send and receive data beams that travel through the optical bus and the beam expander.

14. The FSOC terminal of claim 13, wherein both the beacon transmitter and the one or more transceivers utilize laser diodes to generate the beacon beams and the data beams, respectively.

15. The FSOC terminal of claim 13, wherein the beam steering mechanism comprises a mirror, and wherein a portion of the mirror is configured to reflect both the beacon beams and the data beams generated by the beacon transmitter and the one or more transceivers, respectively.

16. The FSOC terminal of claim 13, further comprising:
an image sensor; and
a beam splitter configured to:
separate one or more received beacon beams from a plurality of received optical beams based on a wavelength of the one or more received beacon beams; and
direct the one or more received beacon beams towards the image sensor.

17. The FSOC terminal of claim 16, further comprising:
one or more computing devices configured to determine a position of a device transmitting the one or more received beacon beams based on one or more of a shape, size, or location of an image of the one or more received beacon beams on a focal plane of the image sensor.

18. The FSOC terminal of claim 17, wherein the one or more computing devices are configured to estimate a centroid of a spot created by the one or more received beacon beams on the focal plane of the image sensor.

19. The FSOC terminal of claim 9, wherein the FSOC terminal is disposed on a mobile platform.

20. A system, comprising:
a first free space optical communication (FSOC) terminal, the first FSOC terminal comprising:
- a beacon transmitter configured to generate beacon beams;
- a beam column comprising a beam expander;
- an optical bus;
- a beam steering mechanism; and
- a prism configured to direct beacon beams generated by the beacon transmitter into the beam column and toward the beam steering mechanism without causing the beacon beams to enter the beam expander; and
a second FSOC terminal adapted to receive light beams from the first FSOC terminal.

* * * * *